US012237911B2

(12) United States Patent
Stafford

(10) Patent No.: US 12,237,911 B2
(45) Date of Patent: Feb. 25, 2025

(54) APPARATUS FOR RECEIVING AND TRANSMITTING DATA VIA A SATELLITE USING AT LEAST TWO POLARISATIONS

(71) Applicant: Global Invacom Limited, Stevenage (GB)

(72) Inventor: Gary Stafford, Stevenage (GB)

(73) Assignee: Global Invacom Limited, Stevenage (GB)

( * ) Notice: Subject to any disclaimer, the term of this patent is extended or adjusted under 35 U.S.C. 154(b) by 433 days.

(21) Appl. No.: 17/635,587

(22) PCT Filed: Aug. 21, 2020

(86) PCT No.: PCT/GB2020/052026
§ 371 (c)(1),
(2) Date: Feb. 15, 2022

(87) PCT Pub. No.: WO2021/038211
PCT Pub. Date: Mar. 4, 2021

(65) Prior Publication Data

US 2022/0303032 A1 Sep. 22, 2022

(30) Foreign Application Priority Data

Aug. 23, 2019 (GB) ..................................... 1912134

(51) Int. Cl.
*H04B 1/38* (2015.01)
*H04H 40/90* (2008.01)
*H01P 1/165* (2006.01)

(52) U.S. Cl.
CPC ............ *H04H 40/90* (2013.01); *H01P 1/165* (2013.01)

(58) Field of Classification Search
CPC .... H04H 40/90; H04H 20/10; H04H 2201/19; H04H 20/103; H04H 20/106; H04H 20/423; H04H 20/426
See application file for complete search history.

(56) References Cited

U.S. PATENT DOCUMENTS 7,769,375 B2 * 8/2010 Mechaley, Jr. ...... H04B 7/2125 455/427
8,634,792 B2 * 1/2014 Rofougaran ......... H04B 1/1027 343/756

(Continued)

FOREIGN PATENT DOCUMENTS

EP 2104179 A1 9/2009
GB 2530604 A 3/2016

*Primary Examiner* — Tuan Pham
(74) *Attorney, Agent, or Firm* — GableGotwals

(57) ABSTRACT

Apparatus is for reception and transmission of data signals at one or more user locations. The data signals are received from and transmitted to remote locations typically via a satellite or cell phone transmission system. The operating condition of the apparatus at the user location is selectively adaptable such as to take into account the particular format in which the data signals are received or are to be transmitted to thereby allow the apparatus to be used in different locations and adapted for use at the time of installation or at a time after installation with no, or minimal, intervention or skilled technical personnel attendance being required at the user location to allow the operation of the apparatus to be adapted.

14 Claims, 2 Drawing Sheets

(56) References Cited

U.S. PATENT DOCUMENTS

Figure 1:
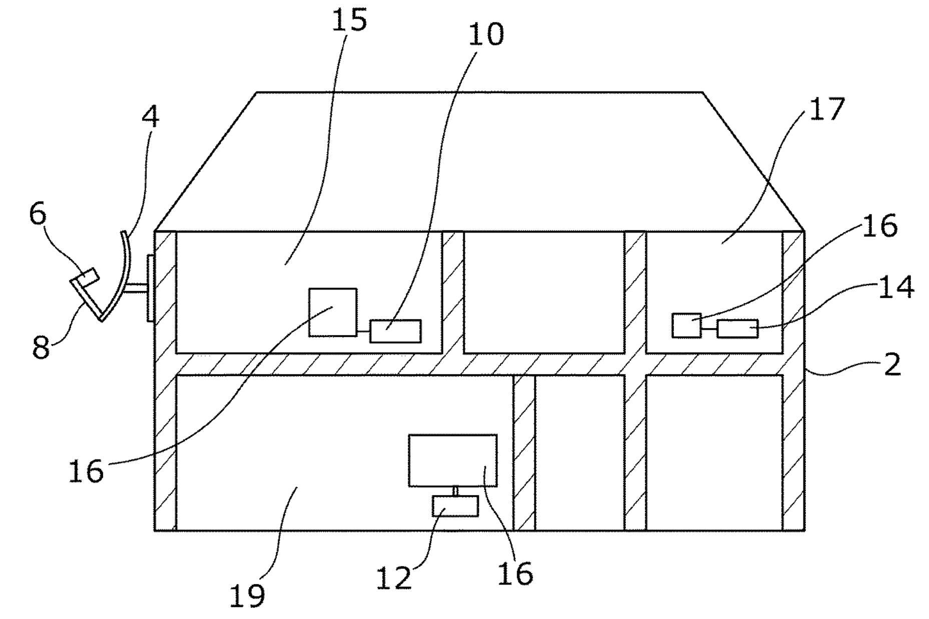

| | | | | |
|---|---|---|---|---|
| 8,818,446 | B2 * | 8/2014 | Ben Laish | H04B 7/18597 455/39 |
| 2005/0239426 | A1 * | 10/2005 | Berretta | H04B 1/406 455/227 |
| 2013/0201070 | A1 | 8/2013 | Parsche | |
| 2014/0057576 | A1 | 2/2014 | Monte et al. | |

* cited by examiner

APPARATUS FOR RECEIVING AND TRANSMITTING DATA VIA A SATELLITE USING AT LEAST TWO POLARISATIONS

CROSS-REFERENCE TO RELATED APPLICATIONS

This United States application is the National Phase of PCT Application No. PCT/GB2020/052026 filed 21 Aug. 2020, which claims priority to British Patent Application No. GB 1912134.2 filed 23 Aug. 2019, each of which is incorporated herein by reference.

The invention to which this application relates is concerned with the reception and transmission of digital data signals which are received from and/or transmitted to an end user or customer remote location and a source location such as a headend location of a broadcaster, typically via a satellite or cell phone transmission system.

In one embodiment the part of the transmission system to which the invention relates is that which is typically located at the user or customer location premises, such as a domestic premises, and which includes apparatus, such as that commonly known as a broadcast data receiver, for the receipt of data which can be transmitted for subsequent processing to allow the generation of video and/or audio to be displayed to a user of the connected apparatus within the premises. The transmission of data signals in the opposite direction to the source or another location, such as a system maintenance organisation location, is typically required for control purposes and/or to allow confirmation of a change of status or mode of operation of the apparatus at the domestic premises and this may occur during use and therefore allows the adjustment or alteration of operation of the apparatus at any given time and without the need for a technician to physically visit each of the many hundreds or thousands of premises to make the change to each apparatus.

The apparatus at the premises typically includes a receiver which, if the transmission system used is satellite based, includes an antenna and processing means typically mounted externally of the premises and connected downstream to what is known as the broadcast data receiver or set top box which allows the data received by the apparatus to be processed to generate the video, audio and/or auxiliary data which may, for example, be used to generate a television or radio programme or internet service, with the particular programme generated in response to a user selection made by the user via the broadcast data receiver.

The antenna via which broadcast data is captured from one or more satellites and then passed to the apparatus to which the invention relates is typically located on an arm which depends outwardly from the satellite antenna and on which a waveguide, and data processing means are mounted in a housing to receive the data signals in the required frequencies reflected from the antenna. The apparatus can also be used to transmit data signals therefrom.

The waveguide and data processing means in the form of a Low Noise Block (LNB) allow selected data signals received from the satellite antenna to pass to processing means provided within the LNB and from the LNB to the connected downstream apparatus in a controlled manner.

The data signals which is received from the satellites, can be received in either or both of a circular polarity format (which is commonly used in the USA) and/or in a linear polarity format (such as is used in the majority of European countries). Both formats are effective but there can be a problem with conventional circular polarity format systems in that the available bandwidth frequency is relatively limited, typically being 12.2-12.7 GHz, as opposed to 10.7-12.7 GHz for linear polarity format systems, and as the demand for the range of available programmes increases, and hence the level of data required to be transmitted at any given time increases, so it is found that the available band width of the circular polarity format systems is not sufficient for the volume of data signals which is required. However, due to the large scale usage of the circular polarity format and the large number of circular polarity format receiving apparatus already fitted in a premises, it is important to be able to alter that apparatus to operate in one, or a combination, of formats.

Another embodiment of the apparatus relates to the use of the invention in a satellite and be used to allow the control and monitoring of the same with respect to, for example, the need to be able to control the particular phase of operation of the same at any given time. In another embodiment of use the invention can be utilised in a cell phone system in order to control the operation of one or more components of the same.

It is also important to be able to alter the operation of the apparatus, whether in circular or linear polarity formats so as to take into account changes which may occur in the operating parameters for the satellite systems and/or the apparatus itself, when the apparatus is in situ, and to be able to identify that the change in mode of operation of the apparatus has been achieved without having to physically visit the sites at which the apparatus is in use. It is also an aim of the invention to be able to identify when the apparatus has been installed and is operating correctly, again without having to subsequently visit the site of installation and/or rely on feedback from the installer which they may delay doing and/or forget to do.

In a first aspect of the invention there is provided apparatus for receiving and processing a plurality of data signals at a user location, said apparatus including a waveguide for receiving data signals and data processing means for processing data signals received by the same from one or more remote locations at one or more frequencies within a predetermined frequency range, said data processing means operable to process data signals received within the predetermined frequency range in circular and/or linear polarity formats and wherein the said apparatus at the user location is operable to transmit data in at least one of the said polarity formats from said user location to one or more remote locations and the operating condition of the said apparatus is selectively adaptable remotely from said user location.

In one embodiment, the data signals are received over any or any combination of bandwidths or overlapping bandwidths in one or a combination of circular and/or linear polarity formats and the lowest frequency and highest frequency values determine the said predetermined frequency range.

In one embodiment the said one or more remote locations to which data is transmitted may be the same or different to the remote locations from which the data signals are received by the apparatus.

Typically the apparatus is included as part of a satellite data broadcast system or as part of a cell phone system.

In one embodiment, the data processing means are provided as part of a Low Noise Block (LNB) which is provided with a series of intermediate frequency (IF) data outlets from which the received data signals are transferred to one or more broadcast data receivers (BDR) with, in one embodiment, the specific data which is transferred to each connected broadcast data receiver selected in response to a user selection made on each of the respective connected broadcast data receivers.

In one embodiment, the transmission of the data from the apparatus is achieved using an upconverter which generates two data signal paths, with each path connected to a probe which depends inwardly to the channel of the waveguide and along which the data signals pass to be emitted from the open end of the waveguide channel and are transmitted to the one or more remote locations.

Although the apparatus is most typically used with regard to the processing and transmission of data in a circular polarity format, the transmission of data in a linear polarity format will also be supported.

Typically the data which is provided to be transmitted is provided as separate In Line (I) and Quadrature (Q) data feed paths.

Typically the data on the respective data paths is controlled with respect to the relative phases and so the required Right Hand and Left Hand Circular polarity formats can be controlled. In one embodiment when the data paths reach the waveguide probes they are 90 degrees out of phase but with matched amplitudes and substantially equal power.

In one embodiment the required output power for the transmission of the data signals is achieved by the sum of the output of respective power amplifier devices provided along the respective paths intermediate the upconverter and the probes, less any combining power loss.

Typically there is provided a combiner for the two data paths and the upconverter can, in one embodiment be controlled to allow fine gain and phase adjustments to ensure that the optimum combining of the data paths is achieved for ongoing transmission of the data signals.

In one embodiment the frequency range at which the data signals is transmitted from the apparatus is offset to the frequency range of the data signals which are received and processed by the apparatus. Preferably the frequency range values for the transmission of the apparatus are greater than the frequency range values for the receipt of the data and thereby allow the dimensions of the waveguide channel required to be provided for the transmission of the data to be reduced.

Figure 2:
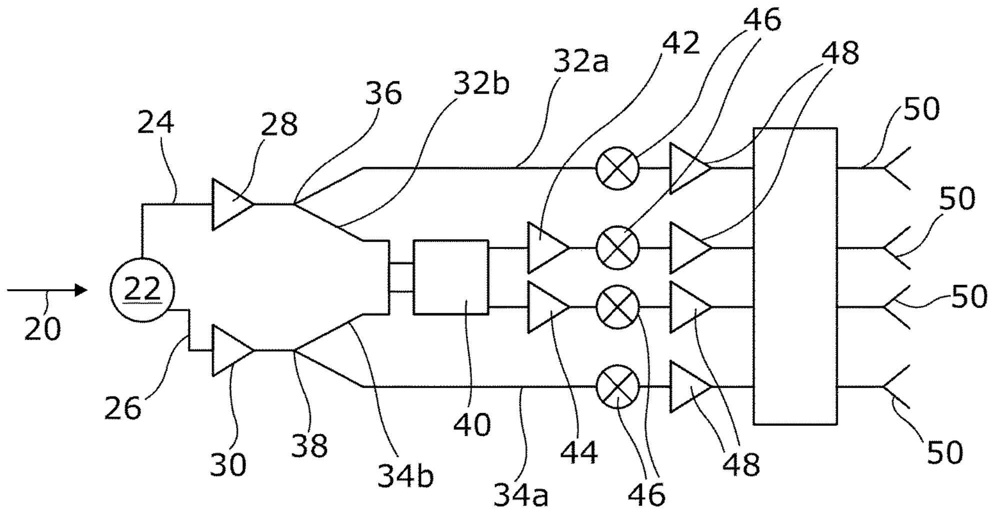
Figure 3A:
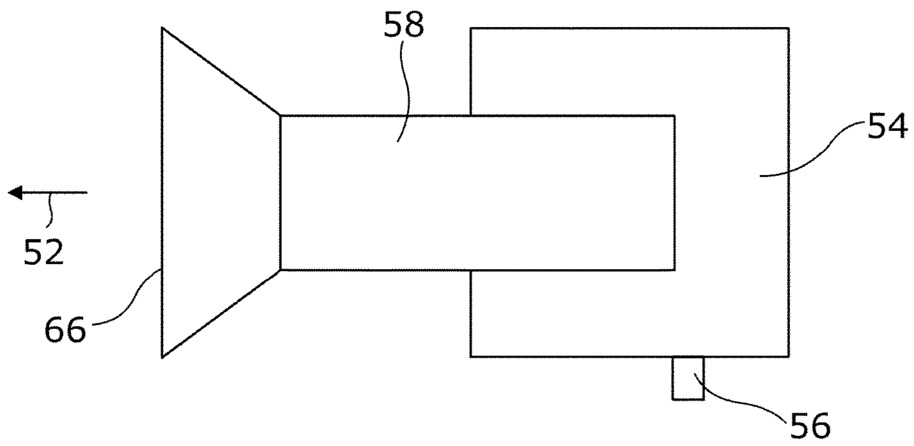
Figure 3B:
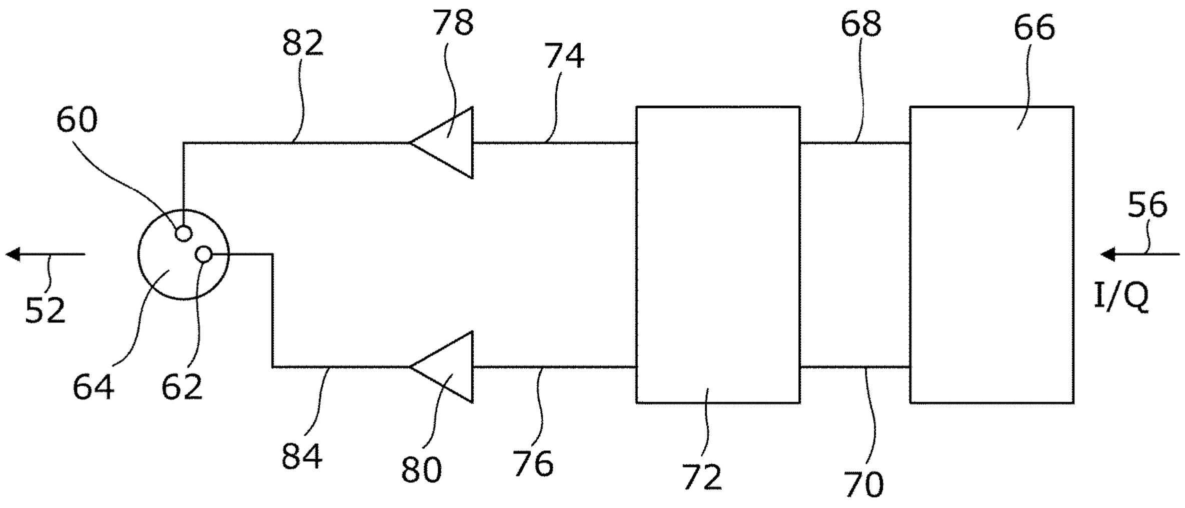

Specific embodiments of the invention are described with reference to the accompanying drawings; wherein FIG. 1 illustrates in a schematic manner apparatus for use as part of a satellite data system;

FIG. 2 illustrates an embodiment of the data paths for receiving data from a satellite transmission system; and FIGS. 3*a-b* illustrate an embodiment of the apparatus and data paths for the transmission of the data from the apparatus in accordance with the invention.

Referring firstly to FIG. 1 there is illustrated a data receiving and transmission system in accordance with the invention at a user or customer premises 2. The apparatus includes an antenna 4 mounted externally of the premises and includes an LNB 6 including a waveguide provided as part thereof and the assembly is mounted on an arm 8. The antenna 4 and LNB 6 are provided and located to receive data signals which are transmitted from one or a series of broadcasters at respective remote locations and transmitted via satellite to a number of user premises 2. The LNB 6 is connected to process and pass the received data signals to, in this embodiment, a series of broadcast data receivers 10, 12, 14 provided within the premises, typically in different rooms 15, 17, 19 as indicated. Each of the BDRs is provided to allow user interaction independently so that, for example, the user of each of the respective BDR's can select a particular television programme which they wish to be generated from the received data. Upon the user selection, a signal is transmitted from the particular BDR to the LNB 6 to allow the data, or a block of data in which the required data is located, for the selected programme to be provided to the appropriate BDR for processing and generation of the video and/or audio to allow the programme to be generated to the user, typically via connected display screen and speakers 16. In accordance with the invention, the apparatus is also provided with the ability to allow the transmission of data from the broadcast data receivers and/or the LNB to a remote location, such as one or more of the broadcaster locations or a different location at which a system provider or maintainer is located so as to allow indications to be provided as to the status and mode of operation of the apparatus at the premises 2. This therefore avoids the need for a physical inspection of the apparatus to be made at the said premises location 2.

Referring now to FIG. 2 there is illustrated an embodiment of the data processing apparatus of the LNB and, in particular the data paths and components provided in the LNB in accordance with the invention and along which received data signals from the waveguide pass.

The received data signals which are reflected from the satellite antenna 4 enter the waveguide and then the LNB in the direction of arrow 20, and the data processing means of the LNB receive the data signals which are in the predetermined frequency range with the data signals being split 22 into two data paths 24, 26 at a 90° phase difference. It should be appreciated that all of the received data is treated in the same way and passes along the two data paths 24, 26 until it reaches respective LNA pair 28, 30 which are phase and amplitude balanced.

Each of the data paths 24, 26 are then split into two data routes 32*a*, 32*b*; 34*a* and 34*b* respectively, using power dividers 36, 38. The two data paths 32*a* and 34*a* are configured to allow the processing of data signals received in a linear plurality format and the data paths 32*b*, 34*b* are configured to allow the correct processing of data which is received in the circular plurality format and pass the data signals to a 3 dB hybrid 40 and onwards to one of a pair of LNAs 42, 44 respectively.

Each of the data paths 32*a*, 32*b*, 34*a* and 34*b* pass the data to a respective mixer 46 and intermediate frequency amplifier 48 from where the data signals are accessible to all of the data connections 50 so that a BDR at the premises can each be connected to a data connection 50 and receive all of the available data signals.

Thus for each data path, for example data path 24, the received data signal is split into two data paths 32*a* and 32*b* and the data which passes along the route 32*a* is processed as if it is all in a linear plurality format and therefore that which is in a linear plurality format will be processed correctly and that data which is not, will not be processed. In data path 32*b* the data is processed as if it is all in a circular polarity format in which case that data which is in a circular polarity format is processed correctly and the linear polarity format data is not, and this is repeated for the data paths 34*a* and 34*b* such that the linear polarity format data is available from the outputs of data paths 32*a* and 34*a* and the circular polarity data is available from the outputs of the paths 32*b* and 34*b*.

In accordance with FIGS. 3*a* and *b* the apparatus of this type includes, possibly separately, but most typically in combination with the receiving apparatus as previously described, the ability to transmit data signals to a remote location using data which travels through the apparatus in the direction 52. The data signals which are to be transmitted is provided as separate I and Q feeds to the data processing means 54 of the LNB 6 via the connection 56 to allow data signals to be passed thereto from a connected BDR. The data signals from the transmission data processing means 54, then enter the waveguide 58 of the LNB 6 via probes 60, 62 which depend into the waveguide channel with the probes angularly offset and provided at different positions along the waveguide channel.

The data processing means 54 are located intermediate the BDR connection 56 and the waveguide 58 and the data processing means include components in the form of an upconverter 66 which passes the data signals in the I and Q feeds to be transmitted, from the BDR connection 56 along respective paths 68, 70 at 90 degrees out of phase, to hybrid 72 and then along respective data paths 74, 76 to respective power amplifiers 78, 80 and from which the data then passes in the circular polarity format and at 90 degrees out of phase along paths 82, 84 to the probes, 60, 62 respectively at location 64 to then enter the waveguide channel 58 and pass along the same to the opening and then transmitted therefrom as indicated by arrow 52 to one or more remote locations.

There is therefore provided apparatus in accordance with the invention which allows the transmission as well as reception of data signals in linear and circular plurality formats without the need for a polariser apparatus to be provided, and to avoid the conventional requirement of physical intervention to switch between linear and circular polarity operating modes of the apparatus and, instead allow the change to be performed on site at the time of installation or subsequently and to be achieved "on the fly" and remotely.

Typically the change in operating mode can be achieved by the sending of a change signal to a modem provided as part of the BDR or within the system at the premises 2 and this change and the type of change can be determined with respect to the known location of the premises 2 at which the apparatus is provided, such as through the use of a GPS location detection system, the transmission of a signal indicating the map coordinates of the location of the apparatus and/or electronic configuration by the operator of the apparatus. As such the same system and method can be used with regard to other electronic devices such as cellular phones in order to allow the change o operating mode of the same to be achieved remotely and with respect to the know n geographical location of the same, and the operating requirements for the apparatus at that location.

The invention claimed is:

1. Apparatus for receiving and processing a plurality of data signals at a user location, said apparatus comprising:
- a waveguide for receiving data signals and data processing means for processing data signals received by the same from one or more remote locations at one or more frequencies within a predetermined frequency range,
- said data processing means operable to process data signals received within the predetermined frequency range in circular and linear polarity format,
- the apparatus at the user location is operable to transmit data in one of the polarity formats from the user location to one or more remote locations and an operating condition of the apparatus is selectively adaptable remotely from the user location, and
- wherein the transmission of data is achieved via data processing means including a combiner for generating two data paths and an upconverter which controls the combining of the data signals from the data paths.

2. Apparatus according to claim 1 wherein the data signals which are received are received over any or any combination of bandwidths or overlapping bandwidths in one or a combination of circular and linear plurality formats and the lowest frequency and highest frequency value determines the predetermined frequency range.

3. Apparatus according to claim 1 wherein the one or more remote locations to which data signals are transmitted may be the same or different to the remote locations from which the data signals are received.

4. Apparatus according to claim 1 wherein the apparatus is included as part of a satellite broadcast system or a cell phone system.

5. Apparatus according to claim 1 wherein the data processing means are provided as part of a low noise block with a waveguide and the low noise block includes one or more intermediate frequency data outlets from each of which the received data signals within the predetermined frequency range can be transferred to a broadcast data receiver.

6. Apparatus according to claim 5 wherein the data signals transferred to each connected broadcast data receiver at a given time is selected in response to a user selection made on each of respective broadcast data receivers independently.

7. Apparatus according claim 1 wherein the apparatus includes selection means to allow the apparatus to be controlled to accept processing and transmission of data signals received in the linear and/or circular polarity formats.

8. Apparatus according to claim 1 wherein transmission of data signals is achieved via data processing means including an upconverter which generates two data paths, with each path being connected to a probe which depends inwardly to the waveguide of the low noise block and along a channel of which the data signals pass to be emitted from an open end of the channel and onwardly transmitted to the one or more remote locations.

9. Apparatus according to claim 8 wherein the data signals are provided to the upconverter as separate in line and quadrature data feeds.

10. Apparatus according to claim 8 wherein data signals in respective data paths are controlled with respect to relative phases to control required right-hand and left-hand circular polarity formats to be controlled.

11. Apparatus according to claim 8 wherein when the data signals on respective data paths reach the waveguide probes, the data signals are 90 degrees out of phase with matched amplitudes and substantially equal power.

12. Apparatus according to claim 8 wherein output power is achieved by a sum of output of respective power amplifier devices provided along respective data paths intermediate the upconverter and the probes, less any combining power loss.

13. Apparatus according to claim 1 wherein a frequency range at which the data signals are transmitted from the apparatus is offset to the predetermined frequency range of the data signals received and processed by the apparatus.

14. Apparatus according to claim 13 wherein values of the frequencies of the frequency range for the transmission of the data signals are greater than the values of the frequencies of the frequency range for the receipt of the data signals.

* * * * *